(12) United States Patent
Rouweler et al.

(10) Patent No.: US 7,632,224 B2
(45) Date of Patent: Dec. 15, 2009

(54) EXCHANGEABLE TOOL

(75) Inventors: Franciscus Wilhelmus Rouweler, Arnhem (NL); Gerrit Bruggink, Hengelo (NL)

(73) Assignee: Wila B.V., Lochem (NL)

( * ) Notice: Subject to any disclaimer, the term of this patent is extended or adjusted under 35 U.S.C. 154(b) by 0 days.

(21) Appl. No.: 11/807,926

(22) Filed: May 30, 2007

(65) Prior Publication Data

US 2007/0297889 A1 Dec. 27, 2007

(30) Foreign Application Priority Data

Jun. 1, 2006 (EP) .................................. 06011424

(51) Int. Cl.
*B23Q 3/155* (2006.01)
*B21D 37/04* (2006.01)
*B21D 37/00* (2006.01)

(52) U.S. Cl. .............................. 483/28; 483/2; 483/901; 294/94; 72/444; 72/446; 72/482.91; 72/482.92; 72/481.2

(58) Field of Classification Search ............. 483/28–29, 483/901, 902, 2; 414/733; 72/481.2, 444, 72/482.91, 482.92, 446, 448; 294/94, 98.1; 901/30, 31, 36, 39, 41
See application file for complete search history.

(56) References Cited

U.S. PATENT DOCUMENTS

| 1,425,727 | A | | 5/1922 | Wallstrom |
| 1,708,854 | A | | 4/1929 | Stahlhut |
| 2,468,055 | A | | 4/1949 | Gibler |
| 2,570,726 | A | | 10/1951 | Smith |
| 2,812,080 | A | | 11/1957 | Campos |
| 4,355,940 | A | | 10/1982 | Derickson |
| 4,509,235 | A | * | 4/1985 | Sakamoto ..................... 483/54 |
| 4,577,284 | A | * | 3/1986 | Christy et al. ............... 483/901 |
| 4,581,811 | A | * | 4/1986 | Eckle ........................... 483/36 |
| 4,719,690 | A | * | 1/1988 | Eckle ........................... 483/49 |
| 4,726,111 | A | * | 2/1988 | Schweizer ................. 414/729 |
| 4,930,332 | A | * | 6/1990 | Hongo ......................... 72/446 |
| 5,009,098 | A | | 4/1991 | van Merksteijn |
| 5,022,256 | A | | 6/1991 | van der Meulen |
| 5,082,415 | A | | 1/1992 | Hayashi |

(Continued)

FOREIGN PATENT DOCUMENTS

DE 39 33 736 A1 6/1990

(Continued)

OTHER PUBLICATIONS

Machine Translation of JP 06-234018 (JP-06-234018 published in Aug. 1994).*

(Continued)

*Primary Examiner*—Erica E Cadugan
(74) *Attorney, Agent, or Firm*—The Webb Law Firm (57) ABSTRACT

The invention relates to an exchangeable tool having a tool body with a receiving end for holding the tool in a receiving structure, wherein a connector is arranged in the tool body for providing a substantially non-rotatable connection with a manipulator for manipulating the tool into and out from the receiving structure,
to a combination of such tool with a manipulator for manipulating the tool into and out from a receiving structure,
and to a method for manipulating such tool into and out from a receiving structure.

27 Claims, 6 Drawing Sheets

U.S. PATENT DOCUMENTS

| | | | |
|---|---|---|---|
| 5,103,665 A | 4/1992 | van Merksteijn | |
| 5,245,854 A | 9/1993 | Bruggink et al. | |
| 5,908,374 A | 6/1999 | Kato | |
| 6,003,360 A | 12/1999 | Runk et al. | |
| 6,264,417 B1 | 7/2001 | Salsburg | |
| 6,327,884 B1 | 12/2001 | Wills | |
| 6,467,327 B1 | 10/2002 | Runk et al. | |
| 6,516,649 B1 | 2/2003 | Mika et al. | |
| 6,557,390 B2 | 5/2003 | Runk et al. | |
| 6,564,611 B2 | 5/2003 | Harrington et al. | |
| 6,656,099 B1 * | 12/2003 | Akami et al. | 483/29 |
| 6,732,564 B2 | 5/2004 | Runk et al. | |
| 6,843,760 B2 * | 1/2005 | Akami et al. | 483/28 |
| 6,848,291 B1 | 2/2005 | Johnson et al. | |
| 6,928,852 B2 | 8/2005 | Enderink | |
| 7,004,008 B2 | 2/2006 | Harrington et al. | |
| 7,021,116 B2 | 4/2006 | Harrington et al. | |
| 2004/0187552 A1 * | 9/2004 | Enderink | 72/481.1 |

FOREIGN PATENT DOCUMENTS

| | | | |
|---|---|---|---|
| DE | 43 21 314 A1 | | 1/1995 |
| DE | 20 2005 010693 U1 | | 9/2005 |
| EP | 494714 A1 | * | 7/1992 |
| EP | 0 974 422 A1 | | 1/2000 |
| GB | 2177631 A | * | 1/1987 |
| JP | 06 115891 A | | 4/1994 |
| JP | 06-234018 A | * | 8/1994 |
| NL | 9100034 | | 8/1992 |
| NL | 1014147 | | 9/2001 |

OTHER PUBLICATIONS

Wilson Tool, Mar. 2006 Brochure.

* cited by examiner

EXCHANGEABLE TOOL

BACKGROUND OF THE INVENTION

1) Field of the Invention

The invention relates to an exchangeable tool having a tool body with a receiving end for holding the tool in a receiving structure.

2) Description of the Prior Art

Such a tool is, for example, known from the European Patent Publication No. 0 494 714.

SUMMARY OF THE INVENTION

When automating the exchange of tools, a manipulator, such as a robot arm is used to take the tools and transport them from the machine, in which the tools are used, to a storage, and vice versa. When manipulating the tools with a manipulator it is beneficial that the tools will not rotate in relation to the manipulator. This is necessary to ensure the control logic to know the exact position of the tool at the end of the manipulator arm, such that the tool can be reliably inserted into the respective machine or into the storage. If the tool would be able to shift or rotate uncontrolled, the manipulator would need to re-orientate the tool before inserting the tool in for example a receiving structure.

When using tools with different sizes, shapes and/or dimensions in one machine, it is beneficial to be able to hold the tool in a uniform way, as otherwise the manipulator has to change grippers in order to be able to exchange the different tools. For example the manipulator would need a first gripper to exchange slim tools, while a second gripper is necessary to exchange wide tools. This would have an adverse effect on the productive time of the machine. It is thus desirable to have an uniform way of holding the tool which is independent from the shape and dimensions of the tool.

A further requirement is that the gripper must hold the tool firmly. When the tool is subjected to substantial accelerations, in combination with the weight, the forces will be substantial. A connection between the gripper and the tool must withstand these forces.

It is therefor an object of the invention to provide a way of holding tools in a uniform way and preventing rotation of the tool in relation to the manipulator.

This object is achieved by an exchangeable tool according to the preamble, wherein connecting means are arranged in a tool body for providing a substantially non-rotatable connection with a manipulator for manipulating the tool into and out of the receiving structure.

With such a connecting means, the connection point is standardized and a connection of the tool with the manipulator is no longer dependent from the geometry of the tool. Due to the substantially non-rotatable connection, the orientation of the tool in relation to the manipulator is always known. Even if the manipulator has a rotatable joint, the orientation in the connection of tool and manipulator is fixed. As the connection is no longer dependent from the geometry of the tool, the connection means can be arranged at any suitable part of the tool and even on opposite sides, such that the manipulator can approach the tool from two sides.

In an embodiment according to the invention the connecting means are arranged such that force transfer between the tool and the manipulator takes substantially place inside the tool body. With this embodiment the outside geometry of the tool is not important for connecting the tool to a manipulator. With the connecting means arranged in the tool body force transfer from the manipulator to the tool and vice versa takes place directly into the body and not through an outer surface of the tool. This is advantageous, as the shape of outer surfaces may differ by the type of the tool.

In another embodiment of the tool according to the invention the connecting means are arranged such that the substantially non-rotatable connection is achieved by connecting the manipulator from only one side to the tool. By connecting the manipulator from only one side to the tool, the shape of the opposite side of the tool is irrelevant for providing the connection.

In a preferred embodiment of the tool according to the invention, the connecting means comprise a cavity with an insertion axis along which a manipulator can be inserted and wherein the cavity is non-rotation symmetrical with respect to the insertion axis. It will be obvious that an inverted solution with the cavity in the manipulator and a protrusion arranged on the tool will provide a similar solution with similar advantages.

Preferably the cavity is cylindrical with at least a rib extending through the cavity. This rib prevents the possible rotation between the tool and the manipulator.

In another preferred embodiment two parallel ribs are arranged at the mouth opening of the cavity. These two ribs provide a further locking of the angular position of the tool in relation to the manipulator and prevents accordingly rotation.

In yet another embodiment of the tool according to the invention the cavity has a non-circular cross-section perpendicular to the insertion axis, the cross-section being for example square or elliptical. This enables insertion of a corresponding manipulator into the tool, and prevents rotation of the tool relative to the manipulator.

In another embodiment of the tool according to the invention, the connecting means provide a uniform, substantially non-rotatable connection and provide means for an additional function. With the uniform connection the shape of the tool is irrelevant for connection with the manipulator. In addition the connection means provide means for an additional function.

Preferably, with the tool according to the invention the means for an additional function comprise at least one terminal for additional functions, such as transfer of signals or activation of a mechanism. With a connection electrical signals can for example be exchanged between the tool and the manipulator. For example the electrical signals are used to read out a memory arranged in the tool, or the signal is used to activate an actuator present in the tool, for example to actuate a safety device. This at least one terminal for additional functions can also be used to transfer a mechanical signal such that a mechanical switch or mechanism is put from a first state into a second state. Furthermore, the terminal can be used to exchange light signals.

In another preferred embodiment the connecting means are arranged at a standardized distance from the receiving end. This enables the manipulator to grab a tool, without exact knowledge of the type of tool present in the receiving structure.

The invention further relates to a combination of a tool according to the invention and a manipulator for manipulating the tool into and out from a receiving structure, wherein the manipulator comprises connecting means for connecting to the connecting means of the tool.

In a preferred embodiment of the combination according to the invention the connecting means of the manipulator are adapted to the non-rotation symmetrical cavity of the tool.

In another preferred embodiment of the combination according to the invention the manipulator has a connecting end having a cross-section perpendicular to the insertion direction, which is substantially equal to the mouth opening of the cavity of the tool, and wherein the manipulator comprises at least one retractable cam extendible from a surface of the connecting end to lock the manipulator to the tool. This at least one cam will extend behind the linear rib present in the cavity, such that the tool is locked onto the manipulator and the tool cannot be separated from the manipulator, without retracting the cam.

In a further preferred embodiment, the connecting end has at least one surface coacting with an inner surface of the cavity to provide a non-rotatable connection.

In yet another embodiment of the combination according to the invention, the combination comprises detecting means for detection of the connection of the manipulator and the tool. This will provide security for the control of the manipulator, that a tool is indeed held by the manipulator.

Preferably, the detecting means comprise a switch.

In yet another embodiment of the combination according to the invention, the connecting means of the tool comprise a bush having a substantially non-rotation symmetrical cavity and the connecting means of the manipulator comprise a connecting end adapted to and insertable into the cavity, wherein the connecting end comprises an retractable cam extendable into an opening into the cavity wall of the bush. Preferably the cam is a ball.

This cam provides for a locking of the connecting end of the manipulator into the bush.

In a preferred combination of the invention the connecting end of the manipulator has a central passage in which a pusher is movable for pushing the cam out of the connecting end. By moving the pusher such that the cam is extended from the connecting end, the locking of the connecting end into the bush is established.

The invention also comprises a method for manipulating a tool into and out of a receiving structure comprising:
  providing a combination according to the invention;
  connecting the manipulator with the tool;
  removing the tool from or inserting the tool into the receiving structure.

In a preferred embodiment of the invention with a combination according to the invention having a retractable cam, the connection is established by inserting the connecting end of the manipulator into the cavity of the tool and extending the retractable cam to lock the manipulator to the tool.

These and other advantages of the invention will be elucidated in conjunction with the accompanying drawings.

DETAILED DESCRIPTION OF THE INVENTION

Figure 1A:
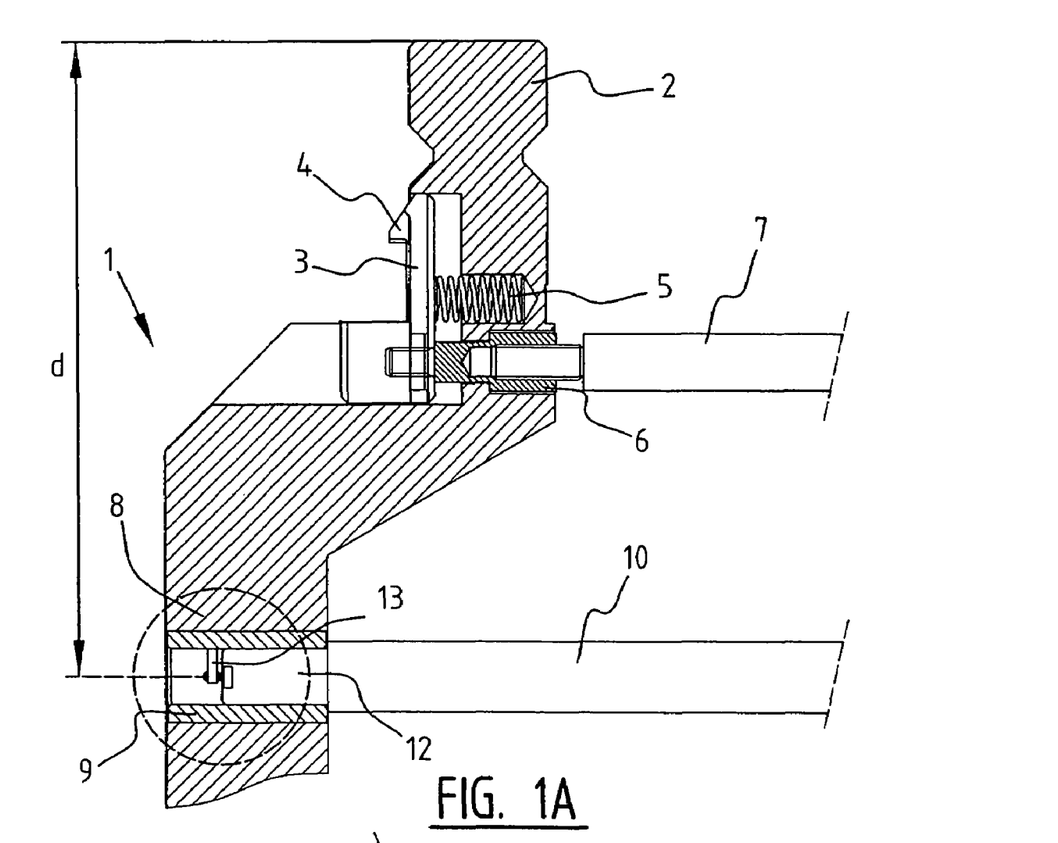
FIGS. 1A and 1B show a cross-sectional view of a first embodiment of a tool according to the invention.
Figure 1B:
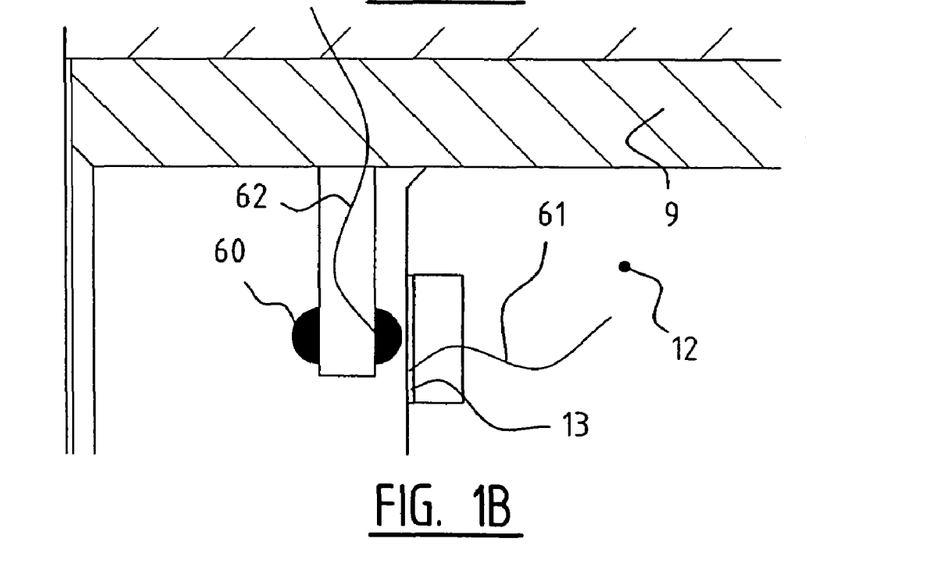

FIG. 1A shows a tool 1 according to the invention. This tool 1 has a receiving end 2, which is suitable to be inserted into a receiving structure of a machine. In this receiving end 2 a safety device 3 is arranged having a safety member 4, which protrudes into a cavity of the receiving structure and prevents the tool from falling out of the receiving structure. Only by retracting the safety member 4 into the receiving end 2, the tool 1 can be taken out from the receiving structure.

The safety device 3 is urged by spring 5. The shown position of the safety device 3 is limited by a guide 6. In this guide 6 a manipulator 7 can be inserted to pull the safety device 3 into the receiving end 2 and to retract the safety member 4 enabling the taking out of the tool 1 from the receiving structure.

In the tool body 8 a bush 9 is arranged, which provides the connecting means for the second manipulator 10 of a robot arm. This bush 9 is provided with thread, such that the manipulator 10 can be screwed into the bush 9 and be tightened to provide a substantially non-rotatable connecting. It is clear that the bush 9 is arranged such in the body 8, that the bush 9 will not rotate in the body 8. The bush 9 can be provided with a locking rib or the bush 9 can be integral with the body 8.

The bush 9 is arranged in the tool body 8 at a fixed distance d from the top of the receiving end 2. This will facilitate the insertion of the second manipulator 10, as then the first vertical direction is already known and only a horizontal position has to be determined. The insertion depth of the end 12 of the manipulator 10 is then determined by an end switch 13. As soon as this end switch 13 contacts the protrusion 60 in the bushing, the control of the second manipulator 10 knows that a connection has been made between the tool 1 and the second manipulator 10.

The protrusion 60 is provided with an electrical contact connected with an electrical line 62. This electrical contact makes contact with the switch 13 which is connected to electrical line 61, which enables also communication of data between the tool and the manipulator.

Then the first manipulator 7 can be inserted into the guide 6 to retract the safety device 3 into the receiving end 2 and to retract the complete tool 1 from the receiving structure.

Instead of using two separate manipulators 7, 10 these manipulators could also be integrated, such that with one manipulator the tool can be held and the safety device can be operated.

Figure 2:
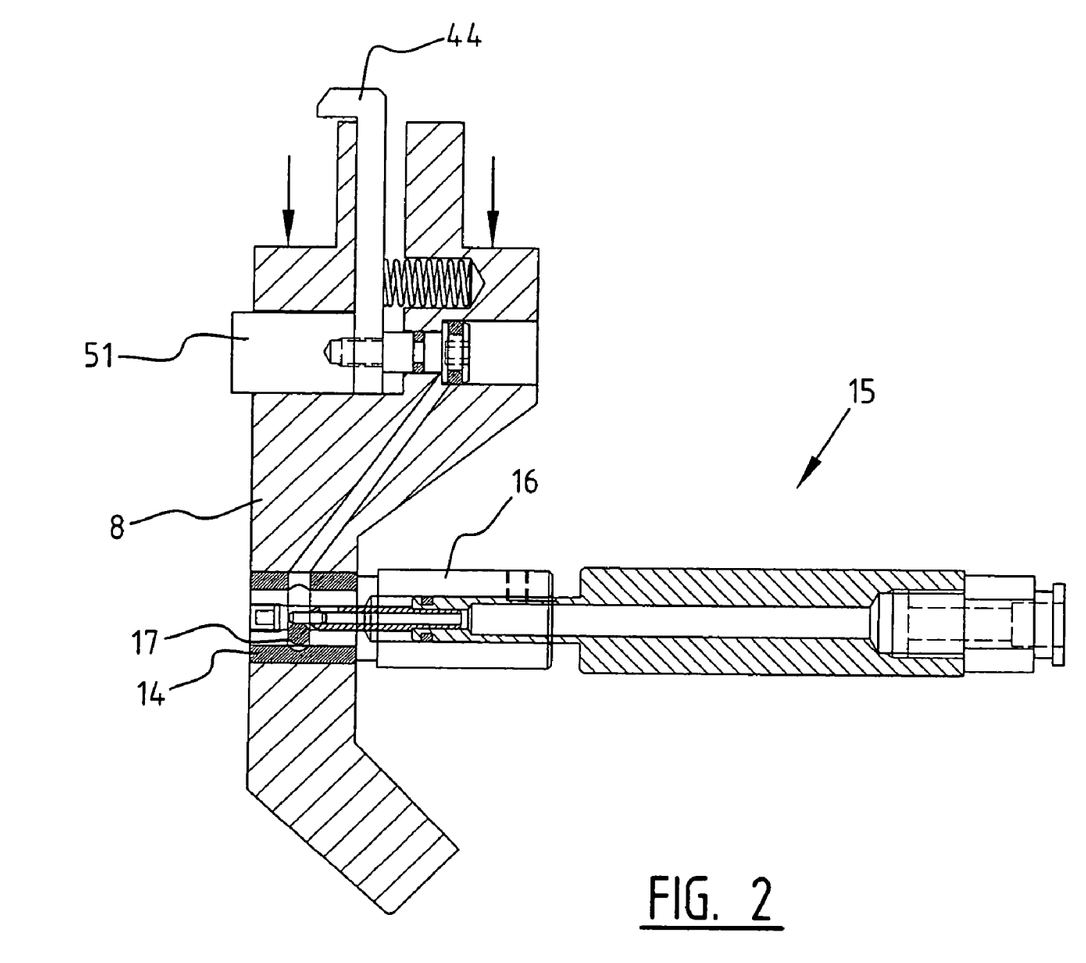
FIGS. 2 and 3 show cross-sectional views of a second embodiment according to the invention.

In FIG. 2 a second embodiment of the invention is shown. A bush 14 is arranged in the tool body 8 and the bush 14 has a rectangular cross section. The manipulator 15 has an end 16 which is inserted into the rectangular opening of the bush 14. This manipulator end 16 has a ball 17, which can be urged into an opening of the bush 14.

Figure 3:
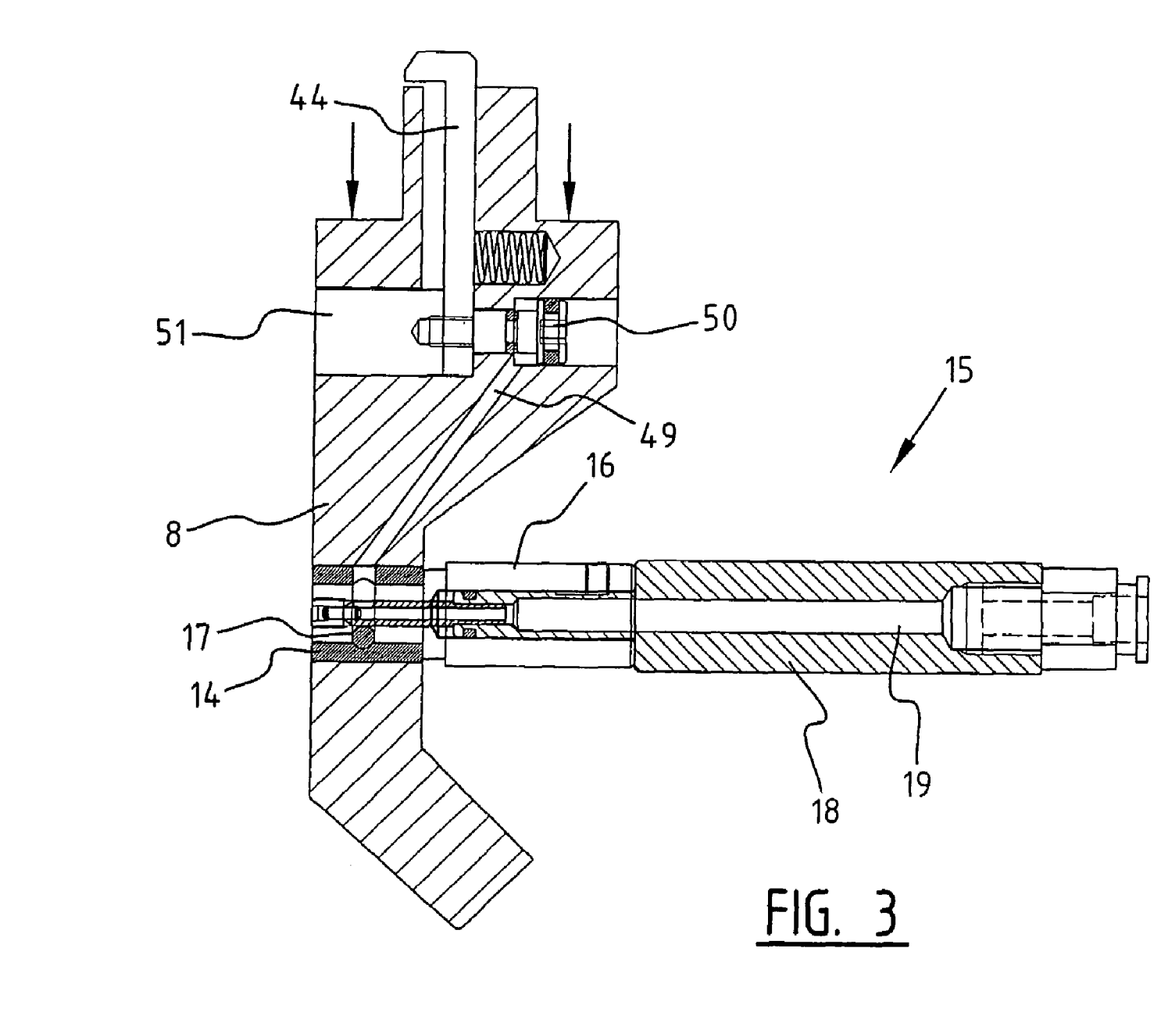

Now turning to FIG. 3 a second part 18 of the manipulator 15 is inserted into the manipulator end 16 through a central passage. Through this movement the ball 17 is pushed into cavity in the bush 14, locking the manipulator end 16 into the tool body 8.

The manipulator 15 is furthermore provided with a channel 19 with which a hydraulic fluid or compressed air can be supplied to the channel 49 present in the tool body 8 and with which a piston 50 can be operated in order to retract the safety member 44 to a tool releasing position.

The tool shown in FIGS. 2 and 3 has a top mounted safety member 44. This safety member 44 can also be manually operated by a push button 51.

Figure 4:
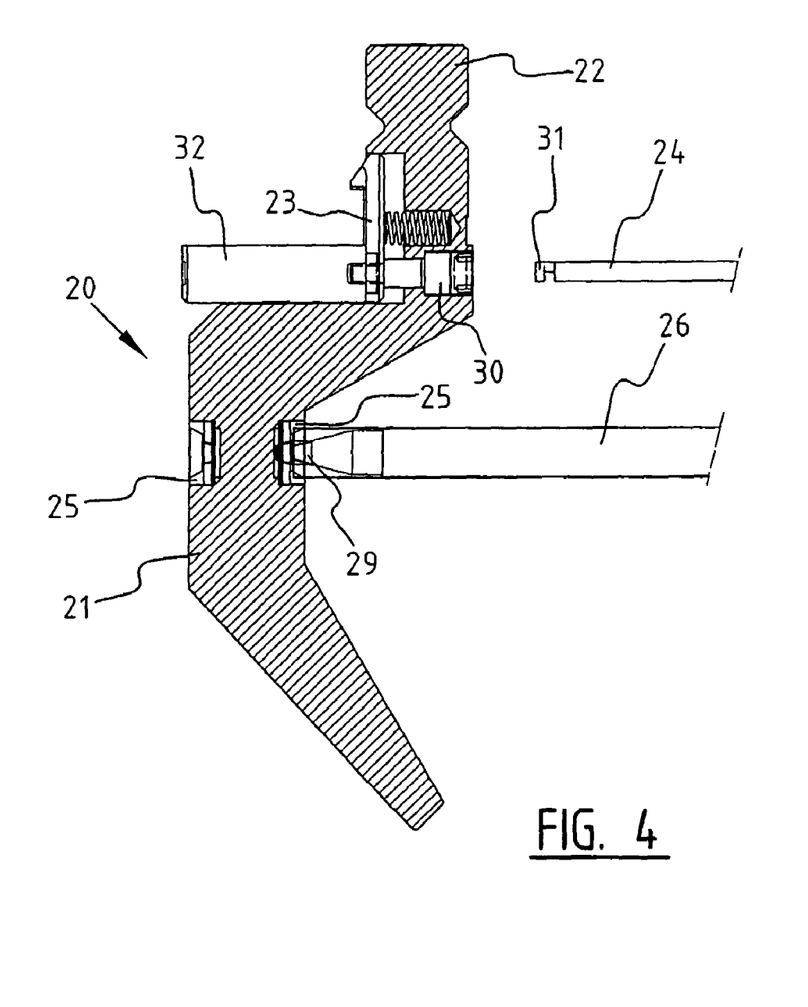
FIG. 4 shows a third embodiment of a tool according to the invention.

FIG. 4 shows a third embodiment 20 of a tool according to the invention. This tool 20 has a tool body 21 and a receiving end 22. The receiving end 22 comprises a safety device 23, which can be operated by a first actuator 24.

In the tool body 21 two inserts 25 are arranged, such that a second manipulator 26 can grip the tool 20 from both sides. The safety device 23 is also provided with a push button 32, such that the tool can always be manually operated. Such a push button could also be provided in the other embodiments described.

Figure 5:
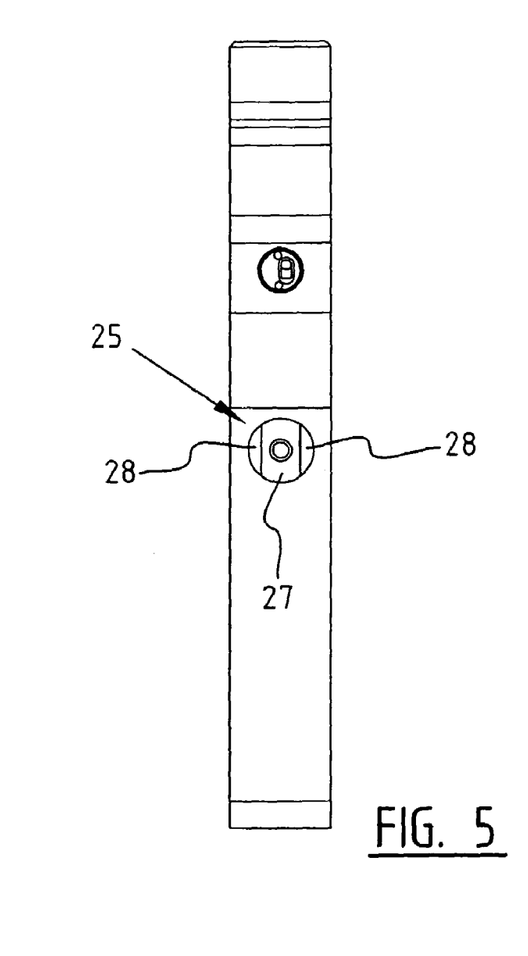
FIG. 5 shows a rear view of the tool according to FIG. 4.

As shown in FIG. 5 the inserts 25 comprise a cavity 27 and two linear ribs 28. The second manipulator 26 is provided with two cams 29, which lock behind two linear ribs 28. In combination with the adapted end of the second manipulator 26 this combination of tool 20 and second manipulator 26 provide for a non-rotatable, locked connection.

Figure 6:
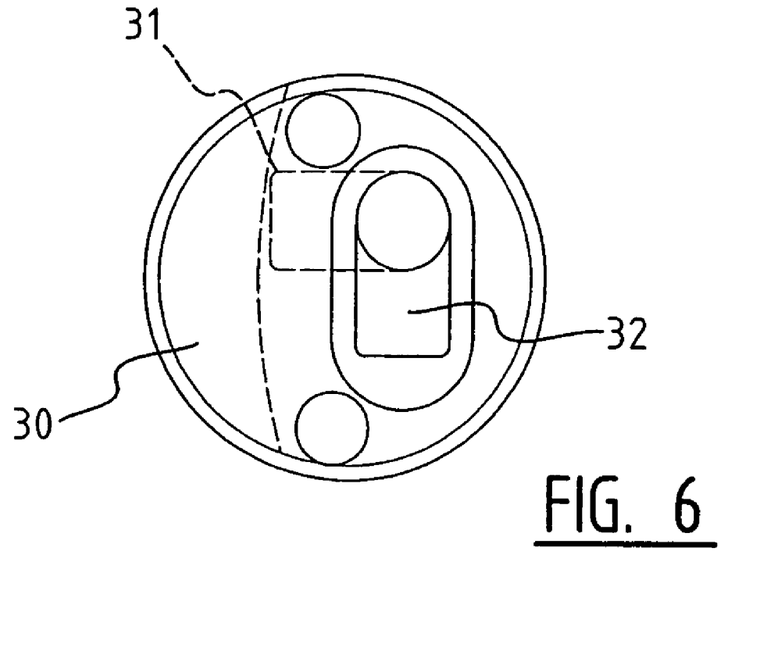
FIGS. 6 and 7 show details of the tool according to FIG. 4.
Figure 7:
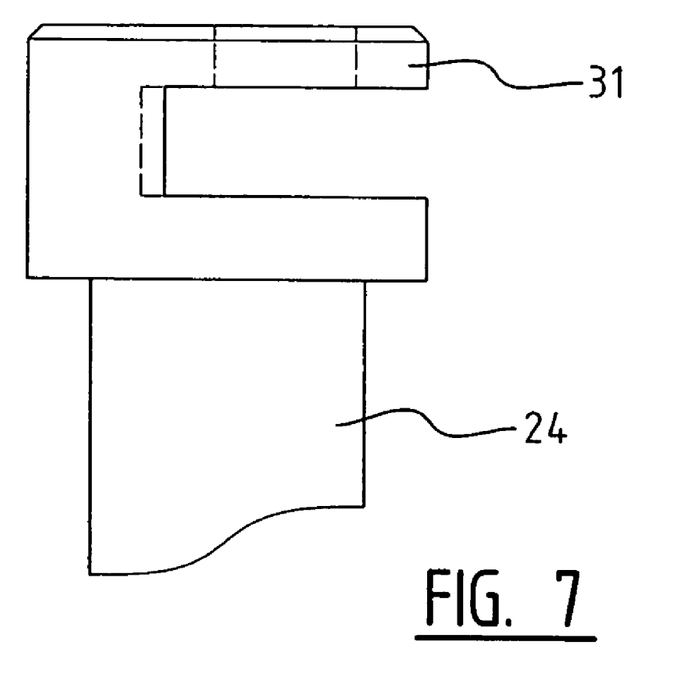

The safety device 23 has a guide 30 in which the end 31 of the manipulator 24 is inserted. The guide 30 has a slot 32 (see FIG. 6) in which the end 31 of the manipulator 24 is inserted. By rotating the manipulator 24 to the position shown in dashed lines of the end 31 shown in FIG. 6, a connection is established between the manipulator 24 and the safety device 23 and the latter can be operated.

Figure 8:
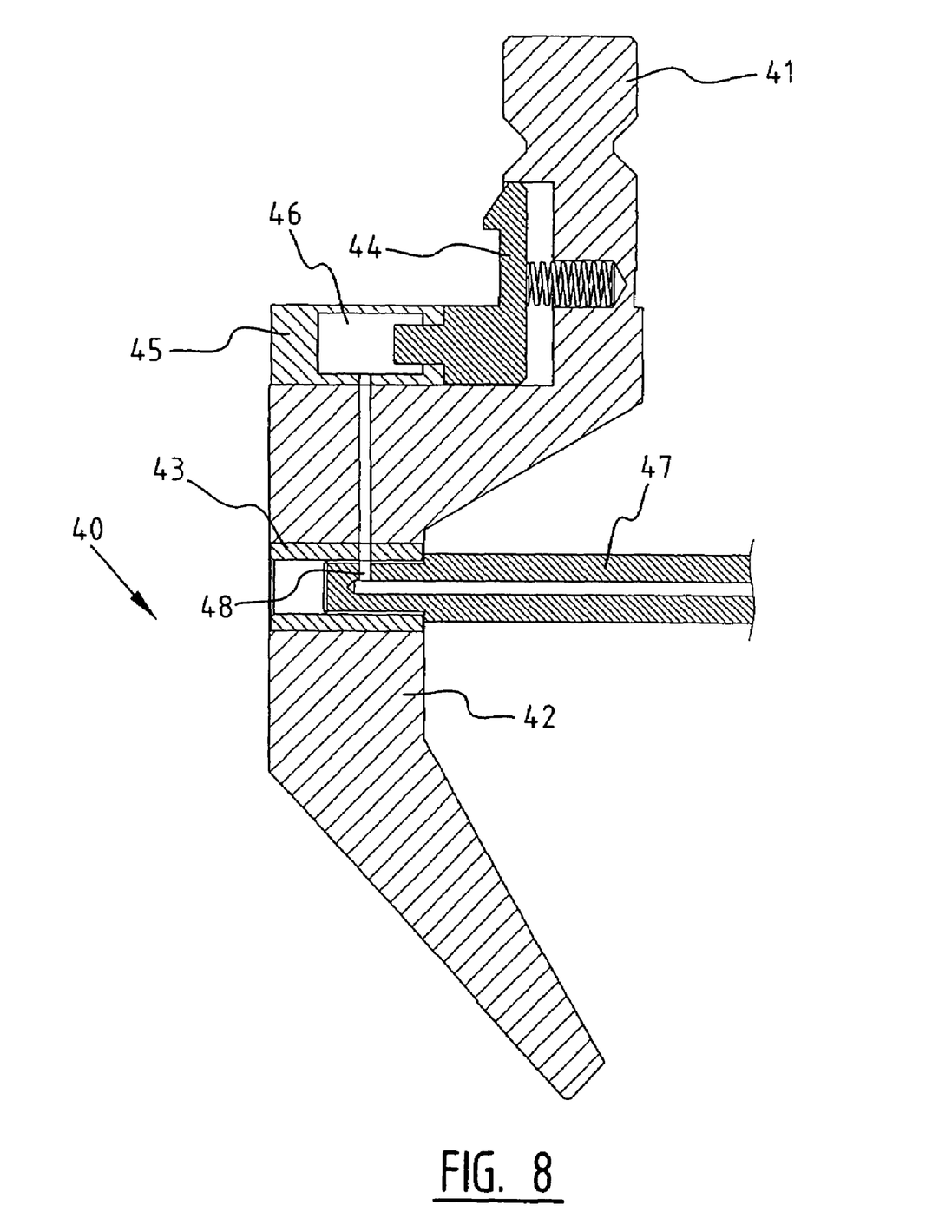
FIG. 8 shows a fourth embodiment of a tool according to the invention.

FIG. 8 shows a tool 40 having a receiving end 41 and a tool body 42. The insert 43 in the tool body 42 is similar to the insert 9 shown in FIG. 1. The safety device 44 is provided with a cylinder 45 which enables actuation of the safety device 44 by providing compressed air into the chamber 46. By inserting the manipulator 47 into the bush 43 a non-rotatable connection is created between the manipulator 47 and the tool 40. The extremity of the manipulator 47 is provided with an outlet opening 48 which connects to a channel 49 running to the cylinder 45. So after insertion of the manipulator 47 into the bush 43 compressed air can be supplied to the chamber 46 and the safety device 44 can be actuated.

Instead of using a pneumatic line an optical line and also an electric line can be used to operate an electrical actuator or to read out a memory provided in the tool, or mechanical operation can be performed by for example a push rod. Also a polymer can be used as actuator.

Although in the embodiments a safety device with retractable safety member is shown, also other embodiments of safety devices can be used in combination with the invention, such as a safety member which extends from the top of the receiving end and is movable between a tool locking position and a tool releasing position.

The invention claimed is:

1. An exchangeable tool having a tool body with a receiving end for holding the tool in a receiving structure and a safety device is arranged in the receiving end, wherein connecting means are arranged in the tool body for providing a substantially non-rotatable connection with a manipulator for manipulating the tool into and out from the receiving structure, wherein the connecting means are arranged such that the substantially non-rotatable connection is achieved by connecting the manipulator from only one side of the tool, wherein the safety device is configured to be released by the manipulator.

2. The tool according to claim 1, wherein the connecting means are arranged such that force transfer between the tool and the manipulator takes place substantially inside the tool body.

3. The tool according to claim 1, wherein the connecting means comprise a cavity with an insertion axis along which the manipulator can be inserted and wherein the cavity is non-rotation symmetrical with respect to the insertion axis.

4. The tool according to claim 1, wherein the tool body includes a channel extending between the manipulator and the safety device.

5. The tool according to claim 4, wherein the channel is a fluid channel.

6. The tool according to claim 3, wherein the cavity has a non-circular cross-section perpendicular to the insertion axis.

7. The tool according to claim 1, wherein the connecting means provide a uniform substantially non-rotatable connection and provide means for performing an additional function.

8. The tool according to claim 7, wherein the means for performing an additional function comprise at least one terminal to exchange signals or to activate a mechanism.

9. The tool according to claim 1, wherein the connecting means are arranged at a distance from the receiving end.

10. A combination, including the tool according to claim 1 and the manipulator for manipulating the tool into and out from the receiving structure, wherein the manipulator comprises connecting means for connecting to the connecting means of the tool.

11. The combination according to claim 10, wherein the connecting means of the tool comprise a cavity with an insertion axis along which the manipulator can be inserted and wherein the cavity is non-rotation symmetrical with respect to the insertion axis, and wherein the connecting means of the manipulator are adapted to the non-rotation symmetrical cavity of the tool.

12. The combination according to claim 11, wherein the manipulator has a connecting end having a cross-section perpendicular to the insertion direction, which is substantially equal to the mouth opening of the cavity of the tool, and wherein the manipulator comprises at least one retractable cam extendable from a surface of the connecting end to lock the manipulator to the tool.

13. The combination according to claim 12, wherein the connecting end has at least one surface co-acting with an inner surface of the cavity.

14. The combination according to claim 10, comprising detecting means for detection of the connection of the manipulator and the tool.

15. The combination according to claim 14, wherein the detecting means comprise a switch.

16. The combination according to claim 10, wherein the manipulator comprises an actuator for actuating a function of the tool.

17. The combination according to claim 16, wherein the function of the tool is provided by the safety device for preventing the tool from falling out of the receiving structure, and said safety device is movable by the actuator between a first tool locking position and a second tool releasing position.

18. The combination according to claim 17, wherein the actuator is integral with the manipulator.

19. The combination according to claim 10, wherein the connecting means of the tool comprise a bush having a non-rotation symmetrical cavity and wherein the connecting means of the manipulator comprise a connecting end adapted to and insertable in the cavity, wherein the connecting end comprises a retractable cam extendable into an opening in the cavity wall of the bush.

20. The combination according to claim 19, wherein the cam is a ball.

21. The combination according to claim 19, wherein the connecting end of the manipulator has a central passage in which a pusher is movable for pushing the cam out from the connecting end.

22. A method for manipulating a tool into and out from a receiving structure comprising:
providing a combination according to claim 10; connecting the manipulator with the tool; and removing the tool from or inserting the tool into the receiving structure.

23. The method according to claim 22, wherein the connecting means of the tool comprise a cavity with an insertion axis along which the manipulator can be inserted and wherein the cavity is non-rotation symmetrical with respect to the insertion axis, and wherein the connecting means of the manipulator are adapted to the non-rotation symmetrical cavity of the tool, wherein the manipulator has a connecting end having a cross-section perpendicular to the insertion direction, which is substantially equal to the mouth opening of the cavity of the tool, and wherein the manipulator comprises at least one retractable cam extendable from a surface of the connecting end to lock the manipulator to the tool, and wherein the connection is established by inserting the connecting end of the manipulator into the cavity of the exchangeable tool and extending the at least one retractable cam to lock the manipulator to the tool.

24. A combination of a tool and a manipulator for manipulating the tool into and out from a receiving structure, the combination comprising:

an exchangeable tool having a tool body with a receiving end for holding the tool in the receiving structure, wherein connecting means are arranged in the tool body for providing a substantially non-rotatable connection with a manipulator for manipulating the tool into and out from the receiving structure, wherein the connecting means are arranged such that the substantially non-rotatable connection is achieved by connecting the manipulator from only one side of the tool; and the manipulator for manipulating the tool into and out from a receiving structure, wherein the manipulator comprises connecting means for connecting to the connecting means of the tool, wherein the manipulator comprises a fluid actuator for actuating a function of the tool provided by a safety device arranged in the receiving end for preventing the tool from falling out of the receiving structure, said safety device is movable by the actuator between a first tool locking position and a second tool releasing position, wherein the safety device is configured to be released by the manipulator.

25. An exchangeable tool having a tool body with a receiving end for holding the tool in a receiving structure and a safety device arranged in the receiving end, wherein connecting means are arranged in the tool body for providing a substantially non-rotatable connection with a manipulator for manipulating the tool into and out from the receiving structure, wherein the connecting means are arranged such that the substantially non-rotatable connection is achieved by connecting the manipulator from only one side of the tool, wherein the connecting means provide a uniform substantially non-rotatable connection and provide means for an additional function comprising at least one terminal in the form of an electrical contact, wherein the safety device is configured to be released by the manipulator.

26. An exchangeable tool having a tool body with a receiving end for holding the tool in a receiving structure and a safety device is arranged in the receiving end, wherein connecting means are arranged in the tool body for providing a substantially non-rotatable connection with a manipulator for manipulating the tool into and out from the receiving structure, wherein the connecting means are arranged such that the substantially non-rotatable connection is achieved by connecting the manipulator from only one side of the tool, wherein the safety device is configured to be released by the manipulator, and the tool further comprising detecting means for detection of the connection of the manipulator and the tool.

27. A combination of a tool and a manipulator for manipulating the tool into and out from a receiving structure, the combination comprising:

an exchangeable tool having a tool body with a receiving end for holding the tool in a receiving structure and a safety device is arranged in the receiving end, wherein connecting means are arranged in the tool body for providing a substantially non-rotatable connection with a manipulator for manipulating the tool into and out from the receiving structure, wherein the connecting means are arranged such that the substantially non-rotatable connection is achieved by connecting the manipulator from only one side of the tool, wherein the safety device is configured to be released by the manipulator; and the manipulator for manipulating the tool into and out from a receiving structure, wherein the manipulator comprises connecting means for connecting to the connecting means of the tool, wherein the connecting means of the tool comprise a bush having a non-rotation symmetrical cavity of a non-circular cross-section and wherein the connecting means of the manipulator comprise a connecting end adapted to and insertable in the cavity, wherein the connecting end comprises a retractable cam extendable into an opening in the cavity wall of the bush.

* * * * *